Figure 1A:
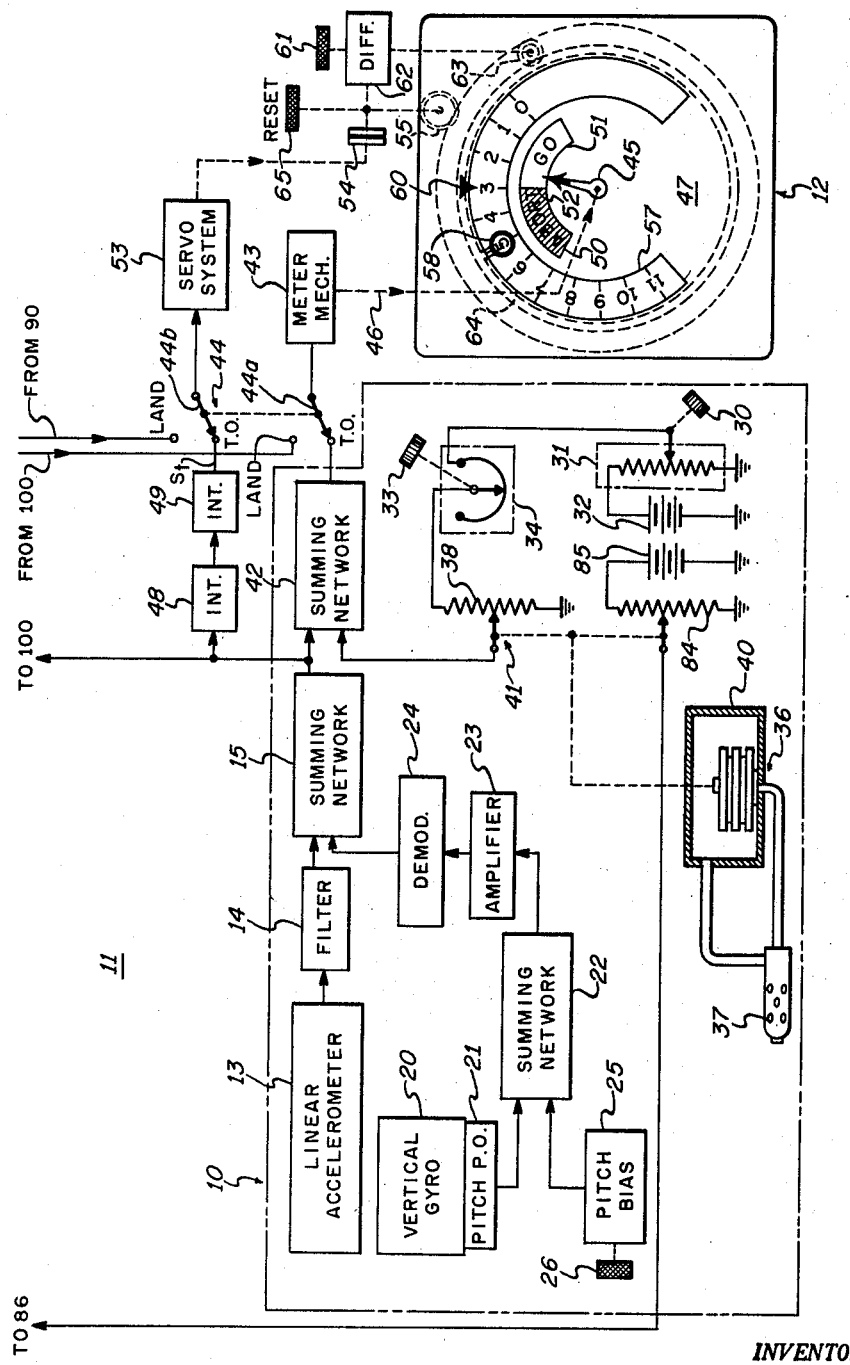

Sept. 15, 1964 T. GOLD 3,148,540
AIRCRAFT PERFORMANCE MONITORING APPARATUS
Filed Feb. 27, 1961 2 Sheets-Sheet 1

INVENTOR.
THEODORE GOLD
BY
ATTORNEY

Sept. 15, 1964     T. GOLD     3,148,540
AIRCRAFT PERFORMANCE MONITORING APPARATUS
Filed Feb. 27, 1961     2 Sheets-Sheet 2
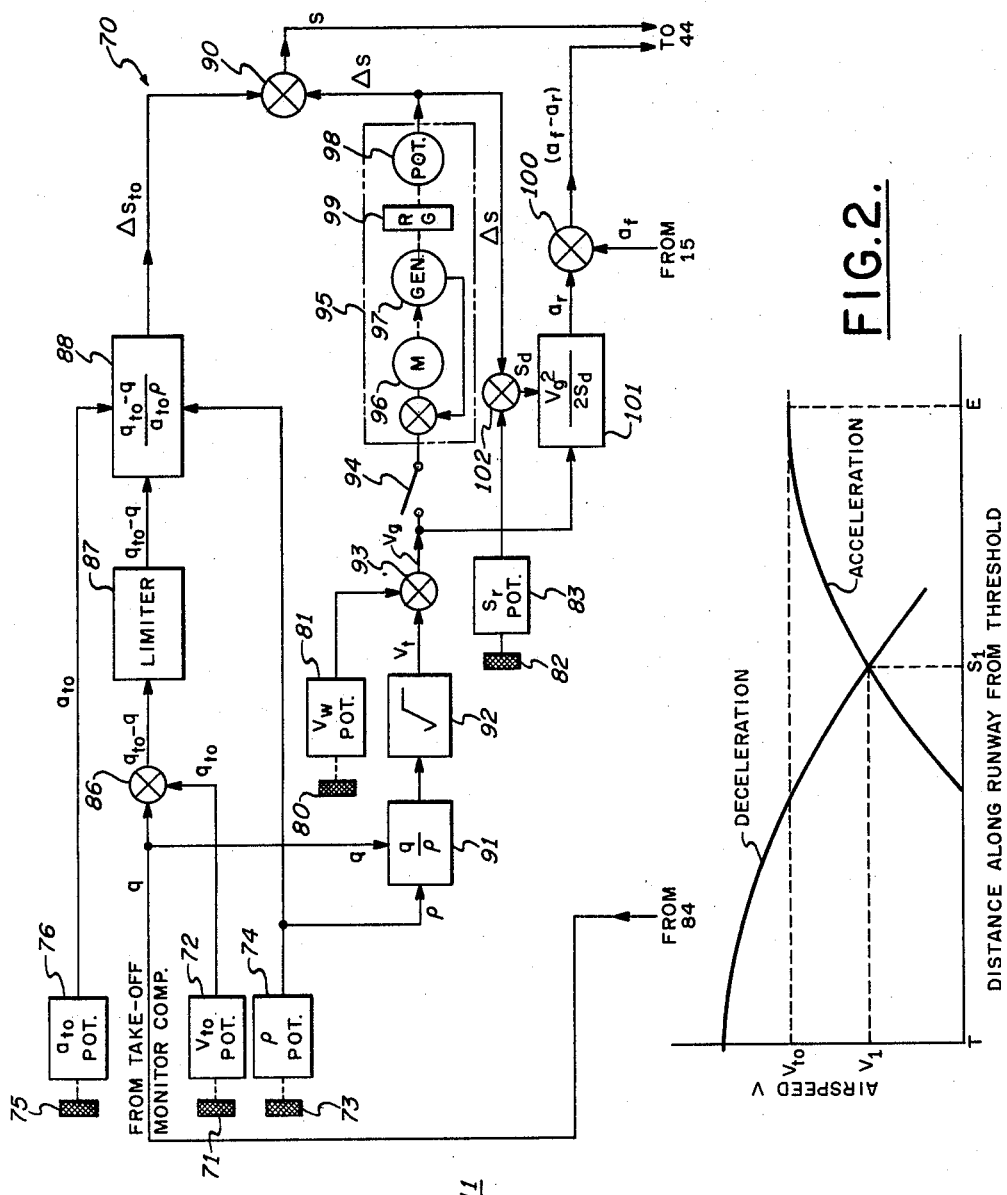
INVENTOR.
THEODORE GOLD
BY
ATTORNEY United States Patent Office 3,148,540
Patented Sept. 15, 1964

3,148,540
AIRCRAFT PERFORMANCE MONITORING
APPARATUS
Theodore Gold, Ronkonkoma, N.Y., assignor to Sperry Rand Corporation, Great Neck, N.Y., a corporation of Delaware
Filed Feb. 27, 1961, Ser. No. 91,758
5 Claims. (Cl. 73—178)

This invention relates to a system for monitoring the landing and take-off performance of an aircraft. In particular, it concerns a system for accurately providing a continuous indication of the actual performance of the aircraft with respect to the required performance of the aircraft during the landing and take-off for purposes of determining whether the aircraft will safely perform as desired within the runway distance available.

This application is a continuation-in-part of copending U.S. patent application Serial No. 821,035, entitled Aircraft Take-Off Performance Monitoring Apparatus, filed June 17, 1959, which became Patent No. 3,077,109, and copending U.S. patent application Serial No. 823,753, entitled System for Monitoring The Take-Off Performance of an Aircraft, filed June 29, 1959, which became Patent No. 3,077,110.

With respect to landing an aircraft, the influence of such factors as incorrect approach speed, late touchdown on the runway, wet or icy runway surfaces, and improper braking technique plus the fundamental difficulties which the pilot may experience in evaluating the significance of these parameters are variables which contribute to and compound the problem of safely landing an aircraft. The problem becomes particularly actute when it is realized that each of these factors influences the distance required to be traversed by the aircraft along the runway during the landing roll and the pilot must readily evaluate the relative importance of each of these variables in a very short time when he is also concerned with other matters. With the advent of modern, large, heavy, high landing speed aircraft and limited runway length, it becomes increasingly difficult for the human pilot to render an accurate decision to land or to perform a go-around maneuver within the time required. As more fully explained in the aforementioned copending patent applications 821,035 and 823,753, a similar problem confronts the pilot during take-off. The present invention automatically solves these problems and provides a continuous indication of the solution to the pilot during both landing and take-off.

It is therefore a primary object of the present invention to provide a landing and take-off monitor which provides continuous monitoring of the performance of an aircraft during landing and take-off.

It is an additional object of the present invention to provide a landing and take-off monitor which utilizes a plurality of common inputs and provides a continuous indication of the performance of the aircraft during landing and take-off by means of a common display.

It is another object of the present invention to provide a landing monitor which provides continuous monitoring of the aircraft performance during take-off.

These and other objects of the present invention are accomplished by a combined landing and take-off monitoring system which compares the actual rate of change of the velocity of the aircraft with the desired rate of change of the aircraft velocity during landing and take-off to continuously indicate the difference therebetween. An indication may also be provided of the point at which a decision must be reached to continue or to abort the particular operation.

The present invention will now be described with reference to the following drawings in which:

FIGS. 1a and 1b constitute a schematic block diagram of a preferred embodiment of a combined landing and take-off monitoring system, and FIG. 2 is a graph of air speed variation versus runway distance for a typical landing.

Referring now to FIG. 1a, the take-off monitoring portion 10 of the combined landing and take-off monitoring system 11 may, for example, be similar to that described in either of the aforementioned applications Serial No. 821,035 or Serial No. 823,753. For purposes of example, the combined system 11 will be described with respect to the components of the system of Serial No. 821,035 while utilizing the display 12 of the system of Serial No. 823,753. Exclusive of the display 12, the take-off monitoring portion 10 of the system 11 is identical to that described with respect to Serial No. 821,035.

A linear accelerometer 13 is connected through a filter circuit 14 to a summing network 15. The signal from the accelerometer 13 is substantially representative of the forward acceleration of the aircraft but as explained in the aforementioned application Serial No. 821,035 may also include a component of the gravity acceleration component. To provide a corrective pitch signal, a vertical gyro 20 is mounted in the aircraft with its sensitive axis normally mounted vertical by means of a gyro erection system (not shown). A pitch pick-off 21 connected to the vertical gyro 20 provides an A.C. signal representative of the pitch attitude of the aircraft. The pitch pick-off 21 is connected to a summing network 22 which in turn is connected to an amplifier 23 and thence to a phase sensitive demodulator 24. The demodulator 24 is connected to provide a second D.C. input to the summing network 15.

A pitch bias circuit 25 is connected to the summing network 22. The circuit 25 is adjusted by means of a knob 26 to correct for the pitch attitude of the aircraft in its taxi position to provide a zero signal output when the aircraft is standing on the runway at the beginning of the take-off run.

As the aircraft proceeds down the runway during the take-off run and its pitch attitude changes, the vertical gyro 20 provides a signal having an amplitude and phase representative of the magnitude and direction of the change of pitch attitude to the summing network 22 to correct the acceleration signal for the gravity components sensed by the accelerometer 13. The output signal from the summing network 15 is a signal which accurately represents the forward acceleration of the aircraft. As more fully explained in the aforementioned application Serial No. 821,035, the erection system (not shown) of the vertical gyro 20 is disconnected to prevent erection of the gyro 20 to a false vertical.

As the aircraft proceeds down the runway during the take-off run, its forward acceleration decreases in a normal manner due to increasing aerodynamic drag and change in engine thrust. For reasons explained in the aforementioned application Serial No. 821,035, the acceleration signal is compensated by a signal representative of $$\frac{Kq}{W}$$

to provide a stable display during the normal operation where the term $$\frac{Kq}{W}$$

represents the expected decrease of acceleration as a function of changes in aerodynamic drag and engine thrust with increasing air speed. A signal representative of the K term is provided by manually adjusting a knob 30 to position the slider of a potentiometer 31. A D.C. voltage source 32 is applied across the resistive windings of the potentiometer 31. A signal representative of the gross weight W is obtained by manually adjusting a knob 33 which positions the slider of a potentiometer 34.

A signal representative of the dynamic pressure $q$ is obtained from a dynamic pressure transducer 36. The dynamic pressure transducer 36 is responsive to the actual static and total pressure as obtained from a Pitot tube 37. The transducer 36 positions the slider of a potentiometer 38 in accordance with dynamic pressure by means of a bellows 40.

The potentiometers 31, 34 and 38 are interconnected to form a D.C. computer network 41 which provides a signal representative of the $$\frac{Kq}{W}$$

factor. The output terminal of the computer network 41 is connected to an input terminal of a summing network 42. The other input terminal of the summing network 42 is connected to the output terminal of the summing network 15. The summing network 42 algebraically sums the corrected acceleration signal and the $$\frac{Kq}{W}$$

signal to provide an output signal representative of the actual aircraft performance which remains substantially constant during the take-off run under normal operation. The output signal from the suumming network 42 is connected to energize a D.C. meter movement 43 when the contact arm 44a of the mode switch 44 is in the downward or take-off position as shown. The meter movement 43 is mechanically connected by a shaft 46 to drive a pointer 45 of the display 12 in accordance with the output signal.

The display 12 is similar to that described in the aforementioned application 823,753, with exceptions to be noted. The pointer 45 is rotatable over the face of the display 12 by means of the shaft 46 which protrudes through an aperture in the center of a disc 47. The pointer 45 is cooperative with the indicia 50 and 51 which may be painted on the disc 47 or which may be movable, the latter as explained in application Serial No. 821,035. The indicium 50, for example, may be painted red while the indicium 51 is painted a contrasting color such as green to provide a prominent line of demarcation 52 therebetween. The extremity of the pointer 45 is so disposed and rotatable as to lie adjacent one of the indicium 50 or 51 during the operation of the instrument in a manner to be described.

The design of the indicia 50 and 51 may be varied to suit the particular aircraft requirements and the type of monitoring system used. For example, when the take-off monitoring portion 10 of the system 11 is of the type shown in FIG. 1, the indicia 50 and 51 may be adjustable in accordance with the minimum acceptable take-off performance in order that the demarcation line 52 is positioned accordingly in a manner fully disclosed in the aforementioned application Serial No. 821,035. With this arrangement the actual acceleration is represented by the position of the pointer 45 and it is compared with the required acceleration represented by the position of the demarcation line 52 in accordance with the teaching of the aforementioned U.S. application 821,035. When the take-off monitoring portion 10 is of the type disclosed in the aforementioned U.S. application Serial No. 823,753, the indicia 50 and 51 may be painted on the disc 47 since in this instance the pointer 45 is itself driven in accordance with the difference between an actual and a required measure as fully explained in said application Serial No. 823,753.

To provide an indication of the distance traversed as well as the distance to be traversed before take-off, the forward acceleration signal from the summing network 15 is integrated twice by means of integrators 48 and 49 and the latter is connected to a servo system 53 when the contact arm 44b of the mode switch 44 is in the take-off position as shown. The servo system 53 is connected to drive a distance card 57 through a slip clutch 54 and gearing 55. The servo system 53 rotates the distance card in a clockwise direction proportional to the distance actually traversed by the aircraft from the beginning of the take-off run. The distance card 57 has graduations thereon representative of distance, for example, in thousands of feet which are cooperative with a fixed lubber line 60.

As the aircraft proceeds down the runway during the take-off run, a point is reached at which the pilot must decide whether to continue the take-off in a normal manner to become airborne, or to discontinue the take-off. The point along the runway at which this decision is made must allow sufficient remaining runway distance to bring the aircraft to a safe stop on the runway. This point along the runway is known as the check line. The distance from the beginning of the take-off run to the check line is the check line distance. The check line distance and a precomputed maximum air speed, whichever is reached first in time, determines the take-off check line. A check line index 58 in cooperation with the distance indications on the card 57 provides an indication of the check line distance. A check line select knob 61 is connected through a differential 62 to a pinion gear 63 which drives a ring gear 64. The check line index 58 is mounted upon and rotates with the gear 64.

Manually adjusting the knob 61 rotates the index 58 until it is aligned with the correct distance on the card 57. Thereafter, the card 57 and the index 58 are synchronously driven in a clockwise direction by the servo system 53; the latter through the slip clutch 54, differential 62, pinion gear 63 and ring gear 64. The check line index 58 is also cooperative with the lubber line 60.

A reset knob 65 is connected to the card 57 by means of the gearing 55 and to the index 58 through the differential 62, pinion gear 63 and ring gear 64. Manual adjustment of the reset knob 65 rotates the card 57 and the index 58 for resetting at the beginning of the take-off run. The slip clutch 54 prevents any damage to the servo system 53 during the reset adjustment.

In the operation of the system of the present invention, at the beginning of the take-off run, the reset knob 65 is manually adjusted to rotate the card 57 until its zero graduation lies beneath the lubber line 60. The check line select knob 61 is then manually adjusted to rotate the check line index 58 until it lies adjacent the distance on the card 57 representative of the check line distance.

The knob 33 of the potentiometer 34 is adjusted in accordance with the gross weight of the aircraft. The knob 30 is adjusted to provide a signal on the potentiometer 31 representative of the K factor of the aircraft. The adjustment of knob 30 for the K factor is performed once for a particular aircraft and remains fixed thereafter. The mode switch 44 is placed in its downward position as shown thereby connecting the summing network 42 to the meter mechanism 43 and also connecting the integrator 49 to the servo system 53.

As the aircraft proceeds along the runway at the beginning of the take-off run, the accelerometer 13 senses the forward acceleration experienced by the craft and provides a signal representative thereof which energizes the meter mechanism 43 to rotate the pointer 45 thereby providing an immediate indication of the actual performance of the aircraft. The pointer 45 is visually compared with the demarcation line 52 to continuously monitor the performance of the aircraft. Normally the pointer 45 will be driven in a clockwise direction to some position beyond the line 52 and adjacent the indicia 51, in a manner more fully described in the aforementioned application Serial No. 821,035. If the aircraft performance is marginal, the pointer 45 will be aligned with the line 52. If the performance is submarginal, the pointer 45 will be to the left of line 47 and adjacent the indicia 50.

Simultaneously, in a manner more fully described in application Serial No. 823,753, the distance traversed signal from the integrator 49 energizes the servo system 53 which rotates the card 57 in a clockwise direction by means of the gearing 55. The card 57 continuously provides an indication of the distance traversed and the distance to be traversed by cooperation of the graduations thereon with the lubber line 60. The servo system 53 also drives the check line index 58 synchronously with the card 57 through the differential 62 and gearing 63 and 64. When the check line index 58 becomes aligned with the lubber line 60, the pilot must render a final decision of continuance or discontinuance of the take-off based on the aforementioned considerations which are more fully elaborated upon in applications Serial No. 821,035 and Serial No. 823,753.

The structure and operation of the preferred embodiment of the landing monitoring portion 70 of the combined system 11 will now be described with reference to FIGS. 1a, 1b and 2.

Referring now to the graph of FIG. 2, a curve representing the variation of air speed with distances along the runway from the runway threshold T is shown for a typical landing run which is labeled deceleration. Also shown is a curve labeled acceleration which is representative of the acceleration characteristics of the aircraft under take-off conditions. The point $S_1$, where the deceleration and acceleration curves intersect, is the point at which a decision must be reached to land or to abort, i.e., go-around, since this point establishes the runway distance required to accelerate the aircraft from its present air speed $V_1$ to its take-off air speed $V_{to}$ by the end E of the runway taking into consideration that a margin must be provided for pilot reaction time and engine response time. Consequently, the point $S_1$ represents the distance along the runway, at which the pilot must decide whether the aircraft can be safely stopped on the available runway length remaining or to accelerate and perform a go-around maneuver. The location of the point $S_1$ is variable depending upon the air speed of the craft as it passes the threshold T and the deceleration actually experienced by the craft for a particular landing.

At any time $t$ subsequent to passing the runway threshold T, the distance $\Delta S$ of the aircraft from the threshold along the runway is given by $$\int_0^t V dt$$

where V is the true air speed and is therefore variable. If a mean aircraft acceleration $a_{to}$ is available for take-off subsequent to an aborted landing attempt, the pilot's decision point $S_1$ will be reached when the relationship $$V_{to}^2 - V^2 = 2 a_{to} (S_r - \Delta S) \tag{1}$$

is satisfied, $S_r$ being the total runway length less the margin required for pilot reaction time and engine response time.

By definition, the dynamic pressure $q$ is equal to $\frac{1}{2}\rho V^2$ where $\rho$ is the prevailing atmospheric density ratio. Consequently, the term $(V_{to}^2 - V^2)$ in Equation 1 is equal to $$\frac{2}{\rho}(q_{to} - q)$$

$$V_{to}^2 - V^2 = \frac{2}{\rho}(q_{to} - q) \tag{2}$$

Equation 1 therefore becomes $$\frac{q_{to} - q}{\rho} = a_{to}(S_r - \int_0^t V dt) \tag{3}$$

The equivalent $$\int_0^t V dt$$

having been substituted for $\Delta S$. As a result $$\left[\frac{q_{to} - q}{a_{to}\rho}\right] - S_r + \int_0^t V dt = 0 \tag{4}$$

or $$S_r = \left(\frac{q_{to} - q}{a_{to}\rho}\right) + \int_0^t V dt \tag{5}$$

The first term on the right-hand side of the Equation 5 is the runway distance required to accelerate the aircraft from an air speed V to its take-off speed $V_{to}$, which we designate $\Delta S_{to}$, while the second term is the portion of the runway already consumed in the attempted landing $\Delta S$, the sum of these two being equal to the total available runway length $S_r$.

The present invention utilizes the above theory to determine the decision point by driving the rotating card 57 of the display 12 as a function of the sums of the two quantities on right-hand side of the Equation 5 while the available runway distance $S_r$ is represented by the settable index 58 which subsequently moves synchronously with the card 57. By this arrangement the pilot is provided with an indication as to when the decision point has been reached, the rate of approach to the decision point, and the sum of the runway distance traversed and the distance required to take-off, in a manner to be more full explained with respect to the landing monitoring portion 70 of FIG. 1.

The decision by the pilot to continue or to abort the landing is based on a comparison of the actual deceleration of the craft and the deceleration required to consummate the landing safely within the limits of the remaining runway distance. The deceleration $a_r$ required to stop the aircraft from a present true air speed V assuming a remaining runway distance $(S_r - \Delta S)$ where $S_r$ is compensated for the pilot reaction time and engine response time is given by $$V^2 = 2 a_r (S_r - \Delta S) \tag{6}$$

since $$q = \frac{\rho}{2} V^2, \quad a_r = \frac{q}{\rho (S_r - \Delta S)} \tag{7}$$

By comparing the actual mean deceleration $a_f$ of the aircraft with the required deceleration $a_r$, the decision to complete the landing may be made contingent on a positive value for the algebraic summation $(a_f - a_r)$. A signal representative of this value is utilized in the present invention to provide a go-no-go indication in a manner to be explained with respect to FIG. 1.

A preferred embodiment of the invention will now be described with respect to FIG. 1 incorporating the principles presented above. Since many of the parameters to be sensed for the landing monitor are the same as those required for a take-off monitor and since a similar display may be provided to serve the dual purpose of monitoring landing and take-off, the preferred embodiment of the landing monitor is incorporated in a preferred embodiment of a combined landing and take-off monitor although it will be appreciated that the landing monitor may be utilized as a separate monitoring device per se.

The signals common to both the take-off monitoring portion 10 and the landing monitoring portion 70 of the combined system 11 include the dynamic pressure signal $q$ and the actual acceleration or deceleration experienced by the craft $a_f$ which in the case of landing is a deceleration signal. The landing portion 70 of the combined system 11 is placed into operation at some time prior to the landing approach by the pilot setting the following quantities into the system by signal generating means:

(1) A signal representative of the dynamic pressure required for take-off $q_{to}$ at the landing gross weight by adjusting a knob 71 of an indicated take-off speed $V_{to}$ potentiometer 72.

(2) A signal representative of the ambient atmospheric density ratio $\rho$ which is a function of the atmospheric pressure and temperature at the runway elevation may be obtained automatically from a density ratio transducer or by adjusting a knob 73 of a density ratio potentiometer 74 accordingly.

(3) A signal representative of the mean required take-off acceleration $a_{to}$ at air speeds near take-off is obtained by adjusting a knob 75 of a take-off acceleration potentiometer 76.

(4) A signal representative of the total runway length $S_r$ compensated for pilot reaction time and engine response time is obtained by adjusting a knob 82 of a runway distance potentiometer 83.

(5) A signal representative of the wind component $V_w$ in the direction of the landing runway is obtained by adjusting a knob 80 of a wind component potentiometer 81.

The quantities 1 through 4 mentioned above may be obtained from appropriate charts in the Pilot's Handbook.

The pilot further adjusts the display 12 prior to the landing approach by setting the reset knob 65 which rotates the card 57 until its zero graduation lies beneath the lubber line 60. The knob 61 is then adjusted to rotate the index 58 until it lies adjacent the distance on the card 57 representative of the total runway distance $S_r$ compensated for pilot reaction time and engine response time. The mode switch 44 is placed in its upper or landing position thereby (1) disconnecting the summing network 42 from the meter mechanism 43 and connecting a signal representative of the difference between the actual deceleration $a_f$ and the required deceleration $a_r$ to the meter mechanism 43, and (2) disconnecting the integrator 49 from the servo system 53 and connecting a signal representative of the total distance S to the servo system 53 in a manner to be more fully explained. A signal representative of the dynamic pressure $q$ is provided by a potentiometer 84 which has its wiper connected to the bellows 40 while its resistive winding is energized by a D.C. power source 85.

The signal representative of the dynamic pressure required for take-off $q_{to}$ from the potentiometer 72 is applied to one input terminal of an algebraic summation device 86 while the actual dynamic pressure signal $q$ is applied to the other input terminal thereof in opposition to the dynamic take-off signal $q_{to}$. The output from the summation device 86 is a signal representative of the difference therebetween which is applied to an input terminal of a limiter 87. The signal representative of the difference $(q_{to}-q)$ is limited to positive values only by the limiter 87 in order that this portion of the system will provide a signal for speeds below the take-off speed $V_{to}$ only. This difference signal $(q_{to}-q)$ is applied to an input terminal of a computing network 88 which is also responsive to the required take-off acceleration signal $a_{to}$. The other input terminals of the computer network 88 are connected to the density ratio potentiometer 74 and to the take-off acceleration potentiometer 76 respectively. During the operation of the system when the speed of the aircraft is below the take-off speed, the network 88 provides a signal representative of $$\frac{(q_{to}-q)}{a_{to}\rho}$$

which is equal to the distance required to accelerate the aircraft to take-off speed from its present speed $\Delta S_{to}$ which is applied to one input terminal of an algebraic summation device 90.

Signals representative of the dynamic pressure $q$ and the atmospheric density ratio $\rho$ are applied to respective input terminals of a dividing network 91 which provides an output signal representative of the dynamic pressure $q$ divided by the density ratio $\rho$ which is applied to a square root taking circuit 92. The circuit 92 provides a signal representative of the actual air speed of the aircraft along the runway $V_t$ which is applied to one input terminal of a summation device 93 while its other input terminal is connected to the potentiometer 81. The wind component signal $V_w$ is applied to the device 93 in opposition to the actual air speed signal $V_t$. The output signal from the device 93 is thus representative of the actual aircraft ground speed. The summation device 93 is selectively connected by means of a threshold switch 94 to an electromechanical integrating device 95. The device 95 may, for example, comprise a servomotor 96 having an output shaft connected to drive a tachometer generator 97 and the wiper of a potentiometer 98, the latter preferably through a reduction gearing 99. The generator 97 provides a rate feedback signal for stabilization purposes.

The threshold switch 94 is actuated by the pilot or by automatic means when the aircraft passes over the threshold T of the runway thereby causing the actual air speed signal $V_g$ to drive the motor 96 and provide a signal representative of the distance $\Delta S$ traversed beyond the runway threshold from the potentiometer 98 irrespective of whether the aircraft has made ground contact or not. The distance traversed signal $\Delta S$ is connected to the other input terminal of the summation device 90 in order that the output thereof is a signal representative of the total distance S. With the contact arm 44b in the landing position, the device 90 is connected to the servo system 53 thereby causing the servo system 53 to rotate the card 57 in accordance with the total distance S in a manner similar to that described above with respect to the take-off monitoring portion 10 of the system.

As the aircraft proceeds along the runway during the landing, the total distance signal S rotates the card 57 in a clockwise direction by means of the servo system 53 in order to provide a continuous indication of the total distance by cooperation of the graduations thereon with the lubber line 60. The servo system 53 also drives the index 58 synchronously with the card 57 as explained above in order that a comparison of the total distance S with the remaining runway distance may be continuously made by comparing the position of the index 58 with the lubber line 60. When the index 58 becomes aligned with the lubber line 60, the pilot must render a final decision regarding continuing to land or performing a go-around maneuver. This decision is based upon the position of the pointer 45 with respect to the demarcation line 52 in a manner to be explained forthwith.

The stopping capability of the aircraft is evaluated by a comparison of the actual deceleration experienced by the aircraft $a_f$ and the deceleration $a_r$ required to stop the aircraft within the runway distance remaining. The actual deceleration signal $a_f$ is obtained from the linear accelerometer 13 and it is compensated for pitch variations by the vertical gyro 20 in a manner explained previously with respect to the take-off monitoring portion 10. The compensated actual deceleration signal $a_f$ from the summing network 15 is applied to an input terminal of a summation device 100.

The signal representative of the required deceleration $a_r$ is obtained from a computing network 101 which has its output connected to another input terminal of the algebraic summation device 100. The required deceleration signal $a_r$ is applied in opposition to the actual deceleration signal $a_f$ in the device 100 thereby providing at its output terminal a signal representative of $(a_f-a_r)$.

To provide the signal $a_r$ the runway distance traversed signal $\Delta S$ from the potentiometer 98 is subtracted from the total runway distance signal $S_r$ from the potentiometer 83 in an algebraic summation device 102. The output signal from the summation device 102 is representative of the remaining runway distance $S_d$ and is applied to an input terminal of the computer network 101. The other input terminal of the computer network 101 is connected to the summation device 93. Within the computer network 101 the signal representative of the true ground speed $V_g$ is squared and divided by a signal representative of twice the remaining distance $S_d$ in order to provide an output signal representative of the required deceleration $a_r$.

The difference between the actual deceleration $a_f$ and the required deceleration $a_r$ obtained from the summation device 100 is applied through the contact arm 44a of the mode switch 44 to the meter mechanism 43. The meter mechanism 43 drives the pointer 45 with respect to the indicia 50 and 51 and the demarcation line 52 in such a manner that a positive value of the control signal representative of $a_f - a_r$ indicates a stopping margin of safety and the pointer 45 will lie adjacent the indicia 51. On the other hand, a negative value of the control signal indicates the aircraft cannot decelerate sufficiently within the distance remaining and a go-around maneuver should be initiated since the pointer 45 lies adjacent the indicia 50 in a manner similar to that described above with respect to the take-off monitoring function of the system 11.

By means of the above display the pilot is provided with a continuous indication from the time he passes the runway threshold of the salient information required to monitor the landing roll. The display also provides information regarding the adequacy of the braking effect on the particular runway under the existing conditions and also insures that any attempt to execute a go-around maneuver may be initiated with sufficient take-off distance remaining on the runway.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. In a system for monitoring the performance of an aircraft, means for providing a signal representative of the distance required to accelerate said craft to take-off speed from its present speed, means for providing a signal representative of the distance traversed beyond the runway threshold, summation means responsive to said distance signals for providing a signal representative of the total runway distance required, means for providing a signal representative of the actual total runway distance available, and indicating means responsive to said required total runway distance and said actual total runway distance for providing a comparison therebetween whereby the performance of the aircraft may be monitored.

2. A system for monitoring the performance of an aircraft during landing comprising accelerometer means mounted on said craft for providing a signal representative of the forward deceleration experienced by said craft, means for computing a signal representative of the predicted required deceleration of said craft, algebraic summation means responsive to said actual and required deceleration signals for providing a control signal representative of the difference therebetween, means for providing a signal representative of the distance required to accelerate said craft to take-off speed from its present speed, means for providing a signal representative of the distance traversed beyond the runway threshold, summation means responsive to said distance signals for providing a signal representative of the total runway distance required, means for providing a signal representative of the actual total runway distance available, and indicating means responsive to said required total runway distance and said actual total runway distance for providing a comparison therebetween whereby the performance of the aircraft may be monitored.

3. A system for monitoring the performance of an aircraft during landing comprising accelerometer means mounted on said craft for providing a signal representative of the actual forward deceleration experienced by said craft, means for generating a signal representative of the actual dynamic pressure experienced by said craft, means for generating a signal representative of the prevailing air density, means for generating a signal representative of the component of the wind velocity parallel to the runway, computing means responsive to said dynamic pressure, air density and wind velocity signal for providing a signal representative of the aircraft ground speed, means for generating a signal representative of the actual total runway distance, means for generating a signal representative of the distance traversed by the aircraft beyond the runway threshold, algebraic summation means responsive to said actual total runway distance and said distance traversed signals for providing a signal representative of the remaining runway distance, computing means responsive to said aircraft ground speed signal and said remaining runway distance signal for providing a signal representative of the required deceleration of said craft within the remaining runway distance, algebraic summation means responsive to said actual and required deceleration signals for providing a control signal representative of the difference therebetween, indicating means including means responsive to said control signal for providing a signal representative of the craft deceleration performance, means for generating a signal representative of the distance required to accelerate the craft to take-off speed from its present speed, and means responsive to said required accelerating distance and said distance traversed signal for providing a signal representative of the total required distance, said indicating means further including means for displaying said required total runway distance and said actual total runway distance for providing an indication of the difference therebetween for establishing a decision point.

4. A system of the character described in claim 3 wherein said means for generating a signal representative of the distance required to accelerate the aircraft to take-off speed from its present speed includes means for generating a signal representative of the dynamic pressure required at take-off, means for generating a signal representative of the mean required take-off acceleration and computing means responsive to said take-off dynamic pressure signal, required take-off acceleration signal, actual dynamic pressure signal and air density signal for providing the signal representative of the distance required to accelerate the aircraft to take-off speed from its present speed.

5. A system of the character described in claim 3 wherein the means for providing a signal representative of the actual distance traversed by the aircraft beyond the runway threshold includes integrating means responsive to said aircraft ground speed for providing a signal representative of the integral thereof, and means for starting said integrating means as the aircraft passes over the runway threshold.

References Cited in the file of this patent

UNITED STATES PATENTS

| | | |
|---|---|---|
| 2,830,291 | Hecht et al. | Apr. 8, 1958 |
| 3,034,096 | Craddock | May 8, 1962 |

FOREIGN PATENTS

| | | |
|---|---|---|
| 844,100 | Great Britain | Aug. 10, 1960 |

OTHER REFERENCES

NACA Technical Note 3252, NACA, Washington, D.C., November 1954.

Snodgrass: "Take-Off Aids to Pilots," Skyways magazine, October 1957, pages 24 and 89–91.

Klass: "Monitor Designed to Aid Jet Take-Offs," Aviation Week magazine, June 23, 1958, pages 65, 67 and 69–71.